Patented May 6, 1952

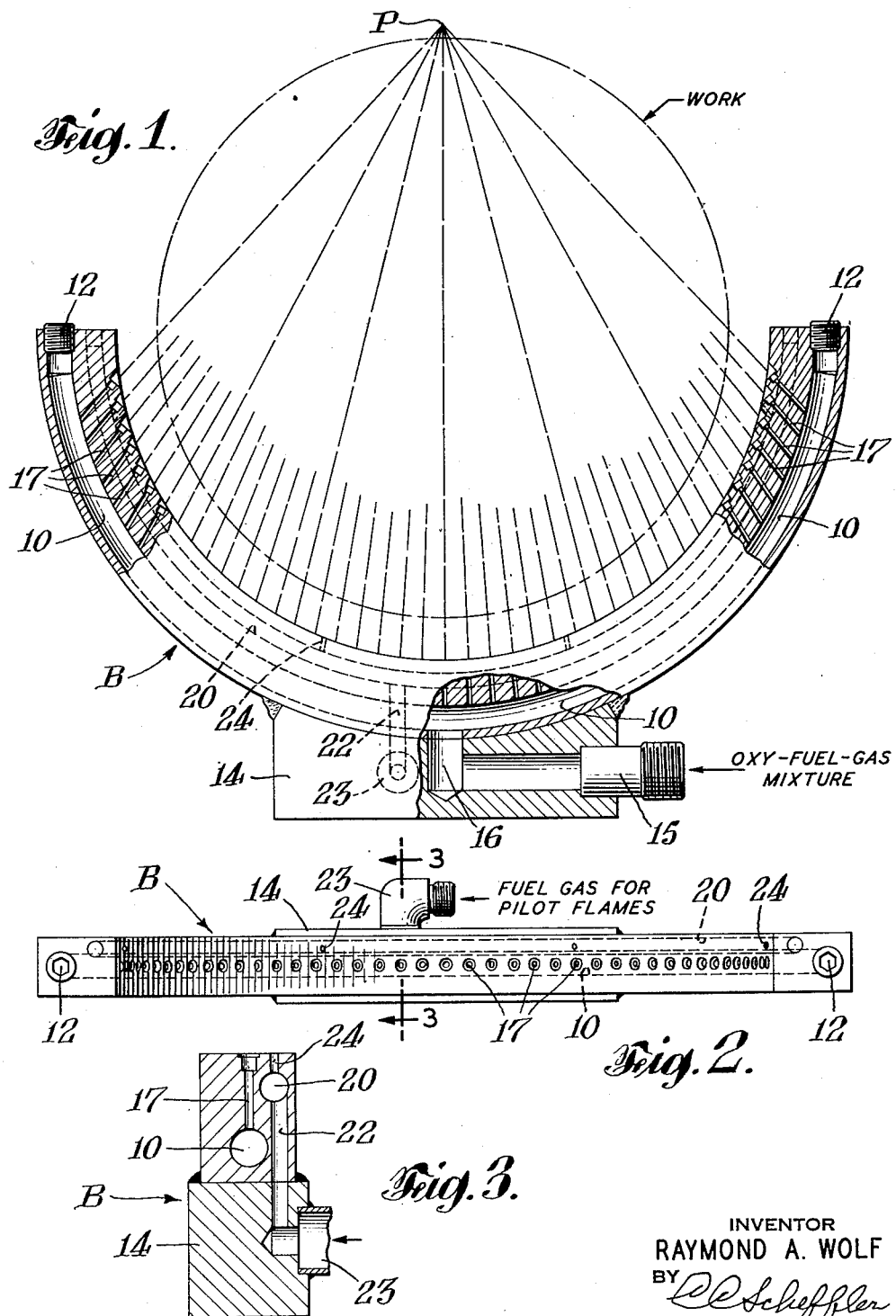

2,595,555

UNITED STATES PATENT OFFICE 2,595,555

METHOD AND APPARATUS FOR BUTT WELDING GLASS MEMBERS

Raymond A. Wolf, Maplewood, N. J., assignor to Union Carbide and Carbon Corporation, a corporation of New York Application August 23, 1948, Serial No. 45,594

2 Claims. (Cl. 49—58)

This invention relates to method and apparatus for butt welding members having surfaces of revolution, and more particularly to the employment of the oxy-fuel flame for this purpose.

In the butt welding of tubular or conical members, it has been proposed to employ arcuate burners concentric with the members and having radial flame ports to project flames inward between the spaced apart ends to be welded. However, the radial flames meeting at the center of the arc form the conventional fishtail which extends laterally and heats the inside of the tube, setting up strains in the material near the weld. Such strains are undesirable in many materials, particularly brittle materials such as glass. In the manufacture of television tubes, for example, breakage as much as ninety per cent has resulted from this fishtail effect.

Objects of the present invention are to avoid the difficulties referred to above, to provide method and apparatus for butt welding tubular or conical members which do not result in undesirable strains, to avoid unnecessary heating of the inside of the tube ends, to eliminate the undesirable effects of the fishtail flame.

According to the present invention members having surfaces of revolution are butt welded by positioning said members in aligned relation with their opposed ends to be welded spaced apart, directing from an arcuate series of flame ports outside the periphery of said members into the space between the opposed ends thereof a series of coplanar oxy-fuel flames converging to a point beyond the periphery of said members and opposite said flame ports whereby the fishtail caused by impact of the several flames is outside the periphery of said members, continuing said flames until said opposed ends are heated to a fusion temperature, and moving said members toward each other to contact said heated ends until said molten ends coalesce.

Other objects and features of novelty will be apparent from the following description and the accompanying drawings, in which:

Fig. 1 is an elevation partly in section of apparatus according to, and for carrying out the method of, the present invention;

Fig. 2 is a plan of the apparatus shown in Fig. 1; and

Fig. 3 is a vertical section taken along the line 3—3 of Fig. 2.

In the drawings, the burner B comprises an arcuate tube of a curvature concentric with the work and having an arcuate passage 10 therein closed at each end by plugs 12. The burner is mounted on a base 14 which has an inlet 15 for oxy-fuel gas mixture communicating by a bore 16 with the passage 10. Flame ports 17 are drilled through the concave side of the burner B into the passage 10 at angles to converge at a point P which is outside of the perimeter of the work and opposite to the burner.

The burner B also has a smaller passage 20 concentric with the passage 10 but axially spaced therefrom. The passage 20 communicates by means of a bore 22 with a pilot flame fuel gas inlet 23. The concave side of the burner B is drilled to provide pilot flame ports 24 extending from the passage 20.

In operation of the burner, fuel gas from the inlet 23 passes through the bore 22 and along the arcuate passage 20, and is distributed to the pilot flame ports 24 and issue therefrom as pilot flames upon ignition. The oxy-fuel gas mixture from the inlet 15 passes through the bore 16 and along the arcuate passage 10 which distributes the gas to the flame ports 17. The mixture issuing from these ports is ignited by the pilot flames, and the resultant flames form a fan shaped pattern of coplanar flames converging at the point P outside the perimeter of the work.

The burner thus described is advantageously employed, for example, in the manufacture of television tubes. The most common type of television tube is made of three parts, namely the face portion which is shaped like a flanged disk, a conical section which is called the funnel and a cylindrical member at the small end of the funnel portion. At the beginning of the welding operation the two parts to be welded are spaced apart far enough to permit the fan shaped flames to go entirely through the tube and meet on the outside of the periphery. The tube parts are rotated to distribute the heat uniformly. After the edges become plastic they are pressed together to cause the molten ends to coalesce.

I claim:

1. In the method of butt welding members having surfaces of revolution in aligned relation with their opposed ends to be welded spaced apart, the improvement which comprises directing from an arcuate series of flame ports outside the periphery of said members into the space between the opposed ends of said members a series of coplanar oxy-fuel flames converging to a point beyond the periphery of said members and opposite said flame ports whereby the fishtail caused by impact of the several flames extends outside the periphery of said members.

2. In apparatus for butt welding members having surfaces of revolution in aligned relation with their opposed ends to be welded spaced apart, the improvement which comprises an arcuate tube having a series of coplanar flame ports on the concave side of the tube, the axes of said ports converging to a point beyond the periphery of a cylindrical locus concentric with the concave side of said tube but of smaller radius and opposite said flame ports whereby the outer limits of the fishtail caused by impact of the several flames is outside the periphery of said cylindrical locus, in which said arcuate tube is part of a blowpipe head comprising a base, said arcuate tube is mounted on said base and provided with an arcuate passage, said flame ports in the concave side of said burner communicating with said passage, said blowpipe head having a second arcuate passage and pilot flame ports in the concave side of the burner communicating with said second passage and axially spaced from said flame ports.

RAYMOND A. WOLF.

REFERENCES CITED

The following references are of record in the file of this patent:

UNITED STATES PATENTS

| Number    | Name     | Date          |
|-----------|----------|---------------|
| 1,775,311 | Halle    | Sept. 9, 1930 |
| 2,194,755 | Kell     | Mar. 26, 1940 |
| 2,252,320 | Hughey   | Aug. 12, 1941 |
| 2,306,054 | Guyer    | Dec. 22, 1942 |
| 2,323,182 | Stuckert | June 29, 1943 |
| 2,438,170 | Hughey   | Mar. 23, 1948 |
| 2,447,569 | Eisler   | Aug. 24, 1948 |

FOREIGN PATENTS

| Number  | Country | Date          |
|---------|---------|---------------|
| 205,885 | Germany | July 31, 1907 |